Aug. 6, 1940.   W. J. MURPHY   2,210,251
HOLDER FOR CONFECTIONS
Filed May 15, 1939

INVENTOR.
William J. Murphy,
BY Archworth Martin,
ATTORNEY.

Patented Aug. 6, 1940

2,210,251

UNITED STATES PATENT OFFICE 2,210,251

HOLDER FOR CONFECTIONS

William J. Murphy, Crafton, Pa.

Application May 15, 1939, Serial No. 273,722

7 Claims. (Cl. 206—56)

My invention relates to holders for confections, and particularly for frozen confections such as ice cream, sherbets etc., that are of a small size for individual servings, and this application constitutes a continuation in part of my application Serial No. 192,538, filed February 25, 1938 (now Patent No. 2,159,338).

As herein described, the holders or containers are utilized in the marketing of small portions of ice cream and the like, over the counter, and has for one of its objects the provision of a holder of this type that can conveniently be handled by the consumer while eating the contents thereof, and with little danger of the melted ice cream dripping on the hands or clothes of the consumer.

Another object of my invention is to provide a holder of the type referred to wherein means are provided for preventing the contents from accidentally falling out of the holder, and wherein the contents can, nevertheless, readily be ejected from the holder while being eaten directly from the holder, or ejected into a dish from which it can be eaten with a spoon.

Figure 1:
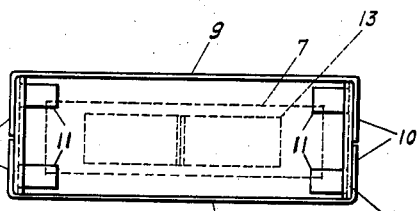
Figure 2:
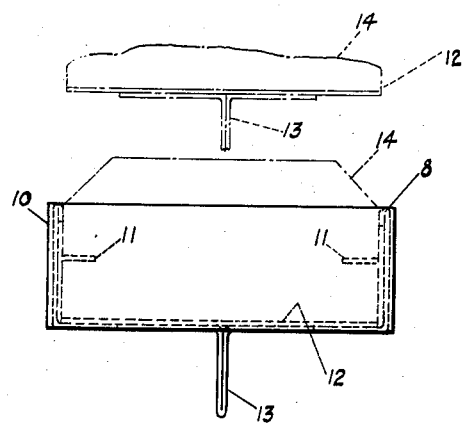
Figure 3:
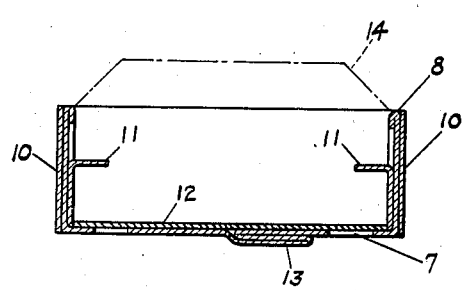

Some of the forms which the invention may take are shown in the accompanying drawing wherein Figure 1 is a plan view of the holder; Fig. 2 is a side view thereof; Fig. 3 is a longitudinal sectional view, and Figs. 4, 5 and 6 are respectively plan, side and sectional views of a modified form of holder.

Referring first to the holder of Figs. 1 to 3, which is of the form shown in my said patent, the holder may conveniently be made of heavy wax paper or cardboard and is formed of a large sheet which has a rectangular opening cut in its lower central portion, as indicated at 7. The ends of the sheet are bent upright and folded upon themselves, as indicated at 8, while the side portions are bent as indicated at 9, with the ends 10 of said side portions folded across the outer faces of the portions 8 and glued thereto. The portions 9 thus form the side walls of the receptacle and the portions 8 the end walls thereof. Tabs 11 are struck from the end walls 8 and, being of cardboard or the like, will flex or bend when the confection is being ejected from the container. Fitting within the receptacle is a bottom plate 12 having a foldable tongue or handle portion 13 glued thereto, and projecting through the cut out at 7 in the bottom of the receptacle.

The ice cream or other confection, indicated by the dash lines 14, can be frozen in the container while inverted, in the manner shown by my said patent, or the material can be introduced with the container in an upright condition and then frozen, or otherwise incorporated into the container. In any event, when the ice cream is to be eaten, it can gradually be ejected from the container by pushing upwardly on the handle 13 which will move the bottom wall 12 toward the open side of the container, the tabs 11 meanwhile flexing and permitting the ice cream to be slid upwardly. Although the tabs 11 are flexible, they will have sufficient holding effect to prevent the confection from accidentally falling out of the holder.

Figure 4:
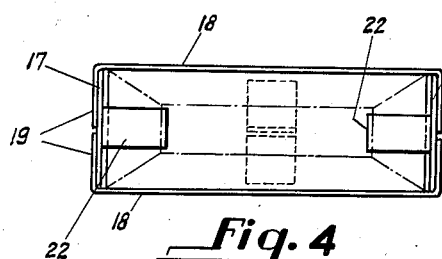
Figure 5:
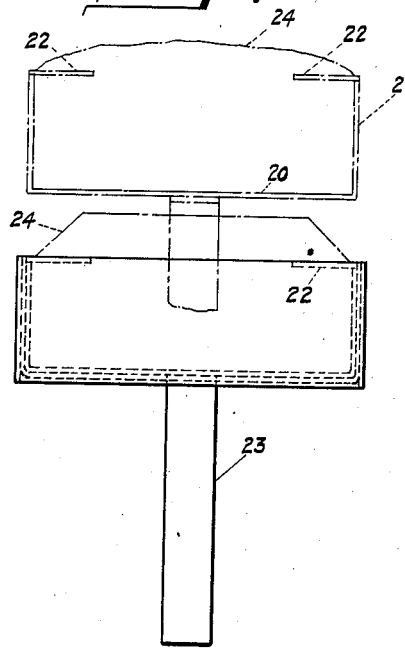
Figure 6:
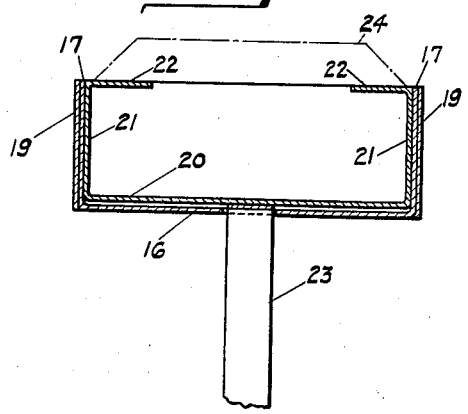

Referring now to Figs. 4 to 6, I show a somewhat different form of receptacle wherein a box-like container has a bottom portion 16 with upturned ends 17 and upturned sides 18, the side portions being folded as indicated at 19 and glued to the ends 17. Within the box-like structure thus described is placed a strip having a flat bottom portion 20 that is approximately coextensive in length and width with the interior of the box and which is bent to form end walls 21 that have tabs 22 projecting therefrom. The portions 20 and 21 constitute a bottom wall and end walls respectively for the confection holder, and the tabs 22 prevent accidental displacement of the ice cream therefrom, as do the tabs 11. A handle or tongue 23 is glued to the member 20 and projects through a slot in the bottom wall 16 of the box, this handle being foldable to conserve space in storage and shipping.

The ice cream 24 is ejected from the box by pushing upwardly upon the member 20, and can be gradually eaten while being moved out of the box. In case it is desired to eat the ice cream from a dish, with a spoon, it can be stripped from the holder 20 by a knife blade when said holder has been elevated to permit such removal.

I claim as my invention:

1. A holder for a confection, comprising a receptacle open at one end, a tab flexibly connected to an inner side wall of the receptacle and projecting inwardly therefrom for imbedment in the confection, and means for pushing the confection from the receptacle.

2. A holder for a confection, comprising a receptacle open at one end, means movable from the opposite end of the receptacle to eject the confection from said open end, and a tab flexibly connected to the receptacle, in position to have its free end imbedded in the confection.

3. A holder for a confection, comprising a receptacle open at one end, a bottom member in the receptacle and provided with a tongue projecting from the opposite end of the receptacle, and a tab flexibly connected to an inner portion of the receptacle, in position to have its free end imbedded in the confection, the said bottom member being movable toward said open end, to eject the confection.

4. A holder for a confection, comprising a receptacle open at one end, a bottom member closing the other end thereof, a movable member disposed on the bottom member and provided with a tongue extending perpendicularly through the bottom, and a flexible tab carried by the receptacle, in position to be imbedded in the confection, whereby when the said movable member is moved toward said open end, the tab will yield to permit ejection of the confection.

5. A holder for a confection, comprising a supporting member for a molded confection, and tabs flexibly connected to said member, in position to be imbedded in the confection, whereby the tabs will yield to permit stripping of the confection from the supporting member.

6. A holder for a confection, comprising a boxlike receptacle open at one end, a bottom plate in the other end and movable toward the open end, and a yieldable element carried by the receptacle, in position to prevent accidental displacement of the confection.

7. A holder for a confection, comprising a boxlike container open at one end, a supporting disc fitting in the receptacle and having wings projecting toward the said open end, and a tab carried by said wings, in position to be imbedded in a confection, the said disc being movable toward said open end, to effect ejectment of the confection from the container.

WILLIAM J. MURPHY.